July 25, 1939.  J. F. CAVANAGH  2,167,331
METHOD AND MEANS FOR ADJUSTING THE PARTS OF FASTENER APPLYING IMPLEMENTS
Filed Sept. 16, 1937
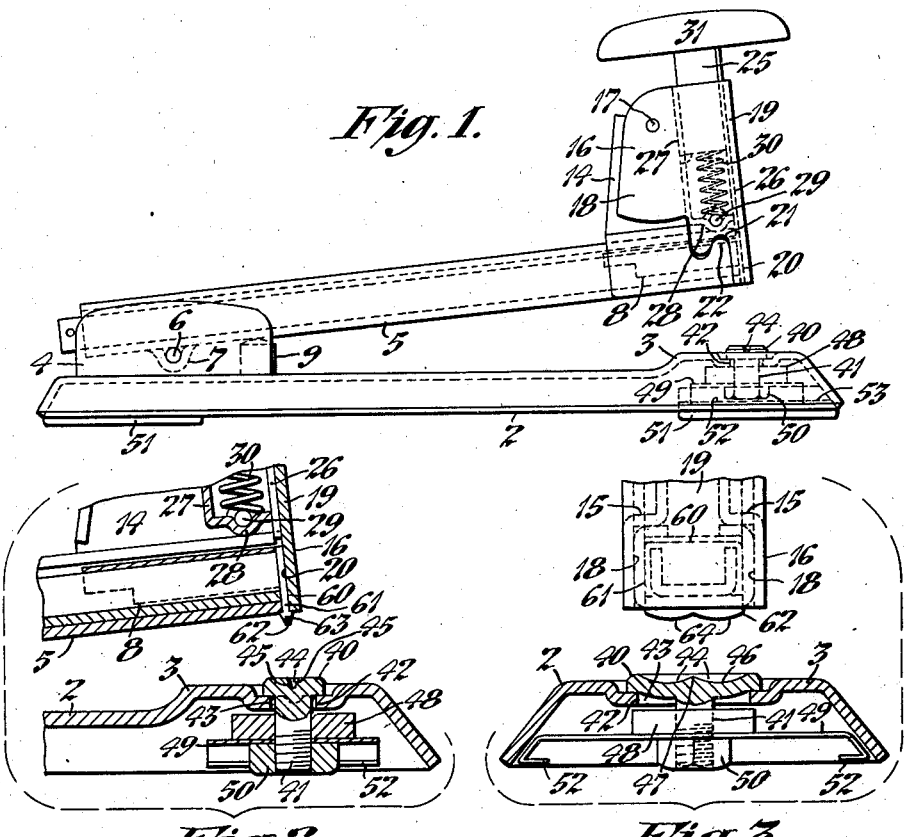
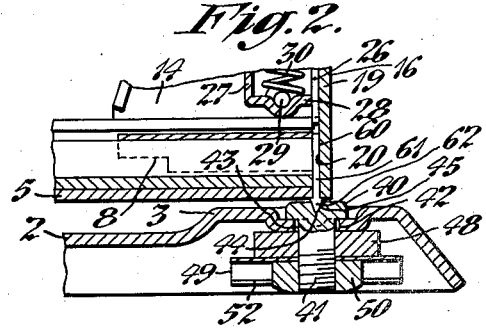
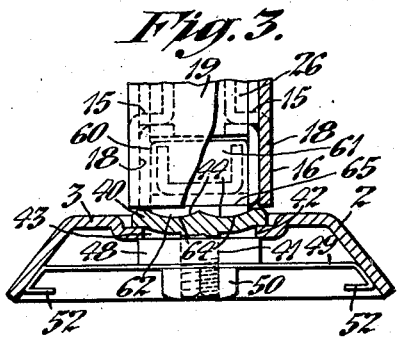
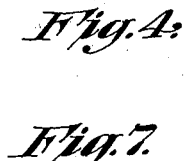
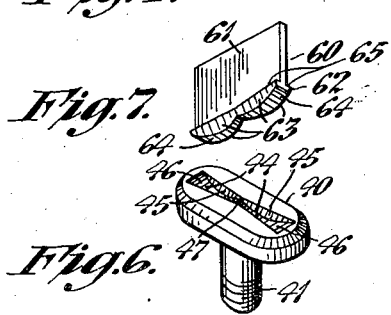
Inventor:
John F. Cavanagh
By
Attorneys.

Patented July 25, 1939

2,167,331

UNITED STATES PATENT OFFICE 2,167,331

METHOD AND MEANS FOR ADJUSTING THE PARTS OF FASTENER-APPLYING IMPLEMENTS

John F. Cavanagh, Providence, R. I., assignor to Boston Wire Stitcher Company, Warwick, R. I., a corporation of Maine Application September 16, 1937, Serial No. 164,179

7 Claims. (Cl. 1—3)

This invention relates to improvements in fastener-applying implements of the type having a base or support embodying a clinching device and a hingedly-mounted movable member or arm carrying the fastener-applying mechanism. The present improvements are concerned particularly with a method and means of relatively adjusting the clinching device and fastener-applying mechanism.

One of the objects of the present invention is to provide a method of the character indicated for locating an anvil on the base of the implement to aline its clincher-grooves with the fastener-applying means on the arm.

Another object of the invention is to provide a method and means for adjusting the anvil both longitudinally and laterally of the base of the implement to accurately aline the clincher-grooves with the fastener-applying means by a series of simple steps requiring little or no skill on the part of the operator.

Another object of the invention is to provide a gauge insertable into the throat through which the staples are driven and having a projecting end adapted to be seated in the clincher-grooves in the anvil to locate the latter in its proper position on the base of the implement.

Further objects of the improvement are set forth in the following specification which describes the improved method and one form of gauge, by way of example, as illustrated by the accompanying drawing. In the drawing:

Fig. 1 is a side elevational view of a standard type of fastener-applying implement to which the method and means of the present invention may be applied;

Fig. 2 is a longitudinal sectional view of the forward end of the fastener-applying implement showing the gauge inserted in the throat of the fastener-applying mechanism with its tapered end projecting therebelow;

Fig. 3 is a transverse sectional view of the same showing the form of the clincher-anvil and cooperating gauge in front elevation;

Fig. 4 is a view similar to Fig. 2 showing the stapling arm rocked about its pivot and the projected end of the gauge seated in the clincher-grooves of the anvil;

Fig. 5 is a transverse sectional view similar to Fig. 3 showing the interfitting relationship of the gauge and clincher-grooves in front elevation;

Fig. 6 is a perspective view of the anvil; and

Fig. 7 is a perspective view of the gauge.

In fastener-applying implements for setting staples in the work it is necessary that the driver and throat through which the fasteners or staples are driven be in accurate register or alinement with the clincher-grooves in the anvil. After the stapling arm has been assembled on the base of the implement it sometimes happens that the throat and driver do not accurately aline with the stationary clincher-grooves in the base due to manufacturing inaccuracies. Unless the error is corrected the legs of the staple will not properly engage in the clincher-grooves thereby resulting in improper or faulty clinching of the legs of the staple. It has heretofore been proposed to correct such inaccuracies by adjusting the position of the arm on the base after assembling the parts of the implement, as disclosed in U. S. Letters Patent to Bickford No. 1,928,304 for Wire stitching or stapling machine, issued September 26, 1933; or by providing a pivot-pin for the arm having eccentric shoulders for adjusting the arm with respect to the base as disclosed in applicant's United States Letters Patent No. 2,108,882, issued February 22, 1938.

The present invention is an improvement over previously known methods and means of effecting adjustment of the cooperating parts of the implement to correct manufacturing inaccuracies. In accordance with the present invention the implement may be constructed with a stapling arm pivotally mounted on the base in the usual manner and the clincher-anvil loosely mounted on the base for adjustment thereon. A gauge is applied to the stapling arm to form a continuation of the staple-driver or the staple-driver may be extended. Preferably, a gauge is used which has a rectangular shank with an end portion in the general shape of a clinched staple or matrix, being applied to the arm by inserting its shank in the throat through which the fasteners are driven so that the shaped end projects therebelow. The stapling arm is then rocked on its pivot to engage the projecting end of the gauge with the anvil. Usually, the manufacturing inaccuracy is so slight that the projected end of the gauge will enter the clincher-grooves, but if the error is not so limited the anvil may be manually shifted on the base until the projected end of the gauge will enter the grooves.

The projected end of the gauge has tapered sides and rounded lobes at its bottom end which correspond in contour to the form of the grooves in the anvil. As the projected end of the gauge is forced into the clincher-grooves to cause it to be seated therein the tapered sides of the gauge will cam the anvil one way or the other longitudinally of the base while the curved lobes seating on the correspondingly-shaped bottom of the clincher-grooves will cam the anvil laterally, if necessary. As the projected end of the gauge constitutes a continuation of the driver and is of a depth corresponding to the thickness of a clinched fastener the grooves in the clincher-anvil will be brought into accurate register or alinement with the staple throat when the projected end of the gauge is seated in the grooves. While the anvil is held in adjusted position on the base by the gauge, as above explained, it is clamped to the base and need not thereafter be adjusted throughout the life of the machine. The gauge is removed after the anvil has been secured in position and the implement is then in condition to receive a supply of fasteners and to apply and clinch the fasteners in the work to be stapled or stitched.

A standard type of stapling implement is illustrated in the accompanying drawing with its parts adapted to be adjusted by the method and means of the present invention. This type of machine is shown and described in applicant's United States Letters Patent No. 2,096,371, issued October 19, 1937. Such implements are employed for applying U-shaped staples to the work, but it is to be understood that the method and means of the present invention may be used with other types of implements or with similar implements for applying other forms of fasteners.

The stapling implement, as herein illustrated, comprises a base 2 of usual construction having a raised boss 3 at its forward end and upstanding ears 4 at its rearward end. An arm 5 in the form of a magazine for staples is rockably mounted on a pivot-pin 6 extending between the spaced ears 4 and through a suitable bearing 7 on the arm. The arm 5 is of usual construction having a channel-like opening therein for receiving a supply of staples, or other types of fasteners, and a spring-pressed pusher 8, see Fig. 1, adapted to be arranged rearwardly of the fasteners for feeding them along the arm. The arm 5 is yieldingly held in raised position as illustrated in Fig. 1 by a spring-pressed button 9 on the base 2 which yields to permit the arm to be rocked about the pivot-pin 6. Secured to the arm 5 adjacent its forward end is a U-shaped bracket or standard 14 having flanges 15 which extend outwardly and downwardly to overlie the sides of the arm 5, see Figs. 1 and 3. The flanges 15 are fixedly secured to the arm 5 as by welding or the like and the standard 14 projects upwardly to form a support for a pivotally-mounted closure 16.

The closure 16 may be of any suitable form and, as herein illustrated, comprises a U-shaped housing which supports the staple-applying mechanism, thus forming a self-contained unit. The U-shaped housing or closure 16 has a front wall 19 and side walls 18 which enclose the forward end and sides of the arm 5 and standard 14, the housing being pivotally mounted on a pin 17 extending through the walls of the standard. When the housing is in its closed position, as illustrated in the drawing, its front wall 19 cooperates with the end of the stapling arm 5 to form a throat 20 through which the staples or other fasteners are driven. The closure or housing 16 is latched in its closed position by means of notches 21 formed in the lower edges of its side walls 18 which cooperate with lugs 22 formed on the depending flanges 15 of the standard 14. The forward end of the arm 5 is opened to receive a supply of fasteners by lifting the closure 16 vertically to release the notches 21 from latched engagement with the lugs 22 and then swinging the housing on the pivot-pin 17.

The fastener-applying mechanism comprises a hollow rectangular plunger 25 mounted for reciprocation in the housing 16 and carrying a staple-driver 26 at its forward side in alinement with the throat 20. The plunger 25 is guided at the front and sides by the forward and side walls 19 and 18 of the closure 16, and at its rear by a suitable backing plate 27 shown in Fig. 1. The backing plate 27 is supported at its upper end by the side walls 18 of the closure 16 and has its lower end 28 bent forwardly and looped around a pin 29 to hold the plate in position.

The plunger 25 and staple-driver 26 are normally held in raised position as illustrated in Fig. 1 by a helical compression spring 30 positioned in the hollow of the plunger and acting between a knob 31 secured to its top and the pin 29. It will readily be apparent that when the staple-applying mechanism is assembled in the housing or closure 16, the closure pivotally mounted on the standard 14, and the arm 5 pivotally mounted on the base 2, the position of the throat 20 cannot be adjusted with respect to the base 2.

In accordance with the present invention an anvil 40 is mounted above the boss 3 at its forward end of the base 2 for relative movement thereon. As herein illustrated, the anvil 40 is of oval contour and has an integral depending threaded stud 41 which passes through a slot 42 in a depressed portion of the boss 3 on the base 2, see Figs. 2 and 6. The dimensions of the slot 42 and the stud 41 are such as to provide a clearance, indicated at 43 in Fig. 2, to permit the anvil 40 to be adjusted both longitudinally and laterally of the base 2. On its upper face the anvil 40 has a pair of laterally alined clincher-grooves 44 of usual construction. Each groove 44 has its sides 45 tapered downwardly and inwardly and its bottom 46 continuously rounded from the upper face of the anvil at its outer end inwardly toward the center of the anvil. The inner ends of the separate grooves 44 meet at the center of the anvil and form an apex 47 below the upper face thereof. A spacer 48 is positioned below the top of the base 2 and a pad-retaining cleat 49 is positioned below the spacer; the spacer and cleat having alined holes through which the stud 41 of the anvil extends. A nut 50 screwed onto the threaded end of the stud 41 is adapted to be set up against the cleat 49 and spacer 48 to clamp the anvil in position on the base. After the anvil 40 has been clamped in position on the base 2 a rubber pad 51, shown in Fig. 1, is attached to the cleat 49 so that the pad covers the nut 50 to conceal it from view and prevent it from being accidentally loosened. For holding the pad 51 the cleat 49 is provided with flanges 52 at its outer edges which engage slots 53 in the edges of the pad. A similar pad 51 is also held by a similar cleat 49 at the opposite end of the base 2.

The setting gauge 60, previously referred to, is adapted to be mounted on the arm 5 to form a continuation of the driver 26 and throat 20 for cooperation with the clincher-grooves 44 in the anvil 40 to locate the grooves in accurate register with the driver. As herein illustrated, the gauge 60 has a rectangular shank 61 of a width and thickness corresponding to the width and thickness of the throat 20, and an end portion 62 of a form corresponding to the clincher-grooves 44 in the anvil 40. The end portion 62 of the gauge 60 projects beyond the shank a distance slightly greater than the depth of the clincher-grooves 44 and has tapered sides 63 which correspond in contour to the tapered sides 45 of the clincher-grooves. A pair of arcuate or rounded lobes 64 on the bottom of the gauge correspond in contour to the rounded bottom 46 of the clincher-grooves. In other words, the projected end 62 of the gauge 60 is of a length and shape corresponding to a driven and clinched staple and the length of the formed end is definitely fixed by shoulders 65. The gauge 60 is mounted on the arm 5 by inserting its shank 61 in the throat 20 until the shoulders 65 engage the bottom of the arm 5 adjacent the throat. The end 62 will then project below the throat and forms a continuation of the staple-driver 26. The anvil 40 may then be adjusted on the base 2 by means of the gauge to aline the clincher-grooves 44 with the throat 20 in the manner as next explained.

With the gauge 60 in the throat 20 the arm 5 is rocked on the pivot-pin 6 until the projected end 62 of the gauge contacts the anvil 40. Ordinarily, the manufacturing inaccuracy will be so slight that the end 62 of the gauge will enter the grooves 44 in the anvil 40. Should the manufacturing error be so great that the end of the gauge 60 will not enter the grooves 44, the anvil 40 may be manually moved on the base 2 to cause the end 62 to enter the grooves. In either case, when the forward end of the arm 5 is pressed downwardly with sufficient force to cause the end 62 of the gauge 60 to seat in the grooves 44 of the anvil 40 the engagement of the tapered sides 63 with the tapered sides 45 of the grooves will cause the anvil to be cammed either forwardly or rearwardly on the base 2 until the grooves are in accurate register with the projected end of the gauge, see Fig. 4. Moreover, the engagement of the rounded lobes 64 on the bottom of the gauge 60 with the rounded bottom 46 of the clincher-grooves 44 will cause the anvil 40 to be shifted laterally one way or the other until the end 62 and grooves 44 are in accurate register laterally, see Fig. 5. The longitudinal and lateral shifting of the anvil 40 on the base 2 is permitted due to the clearance 43 between the depending stud 41 on the anvil 40 and the slot 42 through which the stud projects. Due to the fact that the projected end 62 of the gauge 60 forms a continuation of the staple-driver 26 and is of a depth corresponding to the depth of a clinched staple, the grooves 44 will be in accurate register with the throat 20 and the end of the staple-driver 26 when the end 62 of the gauge is seated in the grooves. While the anvil 40 is held in position on the base 2 by the gauge 60 the nut 50 is turned on the threaded end of the stud 41 to clamp the anvil in position on the base. The position of the anvil 40 need not thereafter be changed throughout the life of the machine. After the anvil 40 has been adjusted on the base and clamped in position by the nut 50 the stapling arm 5 is released and the gauge 60 removed from the throat 20.

The implement may then be loaded with a supply of staples by opening the closure 16 and forcing a stick of staples, or other fasteners, rearwardly into the magazine. After the closure 16 is again rocked to its closed position and latched by the engagement of the lugs 22 on the arm with the notches 21 in the closure, the pusher 8 will feed the fasteners forwardly in the magazine to position the foremost staple of the stick in the throat 20. Depression of the knob 31 first rocks the arm 5 downwardly against the work and then causes the plunger 25 to be depressed and the driver 26 connected thereto carried down to shear the foremost staple from the stick and drive it through the throat 20. The legs of the staple, or other form of fastener, are thus pierced through the work and engaged with the clincher-grooves 44 in the usual manner to cause them to be curled or clinched on the underside of the work. Due to the accurate setting of the anvil the legs of the staple will be projected from the throat 20 in accurate register or alinement with the clincher-grooves 44 in the anvil 40 and will therefore properly engage the rounded bottom 46 of the grooves adjacent their outer ends in the plane of the driver so that they will be properly bent and clinched to provide a perfect stitch.

It will be observed from the foregoing that the present invention provides a novel method and means for adjusting the clinching anvil of an implement of the present type to accurately aline the clincher-grooves with the throat of the staple-driving mechanism. It will further be observed that the method and means of the present invention provide for easily and quickly adjusting the anvil with respect to the throat and may be applied to ordinary types of stapling machines without materially altering the structure of these implements.

Although the method and means for relatively adjusting the fastener-applying means and clinching means as described above is dependent upon the use of a gauge, it is to be understood that other means in the throat can be used to act as a guage. For example, the construction can be such that the end of the driver will project from the throat and act as a gauge or as a sight for alining the clinching means therewith.

While I have herein described and illustrated one form of means by which the method of the present invention may be practiced, it is to be understood that various modifications may be made in the structure and arrangement of such means without departing from the spirit or scope of the invention. Therefore, without limiting myself in this respect, I claim:

1. The method of relatively adjusting and securing the clinching means and fastener-applying means of a fastener-inserting implement to aline the clinching means with the throat of the fastener-applying means through which the fasteners are driven which comprises providing means in the throat adapted to project therefrom, relatively moving the fastener-applying means and clinching means to aline the latter with the projecting end of the means in the throat, and then securing the clinching means and fastener-applying means in adjusted relationship.

2. The method of relatively adjusting and securing the clinching means and fastener-applying means of a fastener-inserting implement to aline the clinching means with the driving element in the fastener-applying means which comprises applying a gauge to the fastener-applying means to cause it to project therefrom in alinement with the driving element, relatively moving the fastener-applying means and clinching means to aline the latter with the projecting end of the gauge, and then securing the clinching means and fastener-applying means in adjusted relationship.

3. The method of relatively adjusting and clamping the anvil with respect to the fastener-applying mechanism of a fastener-inserting implement to aline the clincher-grooves in the anvil with the driving means of the fastener-applying mechanism which comprises applying a gauge to the fastener-applying mechanism projecting therefrom, moving the anvil on the base to aline the clincher-grooves with the projecting portion of the gauge, and then clamping the anvil in its adjusted position.

4. The method of adjusting and clamping an anvil on the base of a fastener-inserting implement to aline its clincher-grooves with the throat of a relatively movable fastener-applying mechanism which comprises inserting a gauge having a tapered end in the throat with its tapered end projecting therefrom, moving the fastener-applying mechanism toward the base to cause the projecting tapered end of the gauge to seat in the clincher-grooves to permit adjustment of the anvil in position on the base, and then clamping the anvil on the base while held in position by the gauge.

5. The method of adjusting an anvil on the base of a fastener-applying implement to aline its clincher-grooves with the throat of a relatively movable fastener-applying mechanism which comprises inserting a gauge having a tapered end with rounded lobes in the throat of the fastener-applying mechanism so that its tapered end projects therefrom, moving the fastener-applying mechanism toward the base to cause the projecting end of the gauge to seat in the clincher-grooves whereby the tapered sides and rounded lobes will cam the anvil both longitudinally and laterally of the base to aline the clincher-grooves with the throat, and then clamping the anvil on the base while held in position by the gauge.

6. A gauge for relatively adjusting the clinching anvil and fastener-applying means of a fastener-inserting implement to aline the clincher-grooves in the anvil with the driving element of the fastener-applying means, said gauge having a shank adapted to be inserted into the fastener-applying means to aline it with the driving element and a projecting tapered end adapted to seat in the clincher-grooves in the anvil to cam the latter longitudinally of the implement to aline the clincher-grooves with the driving element.

7. A gauge for relatively adjusting the clinching anvil and fastener-applying means of a fastener-inserting implement to aline the clincher-grooves in the anvil with the driving element of the fastener-applying means, said gauge having a shank adapted to be inserted into the fastener-applying means to aline it with the driving element and a projecting tapered end with rounded lobes of a contour corresponding to the contour of the clincher-grooves in the anvil, the projecting end of the gauge being adapted to seat in the clincher-grooves in the anvil to cam the latter both longitudinally and laterally to aline the clincher-grooves with the driving element of the fastener-applying means.

JOHN F. CAVANAGH.